United States Patent [19]

Huang

[11] Patent Number: 5,066,158
[45] Date of Patent: Nov. 19, 1991

[54] COMBINED NEGATIVE HOLDER AND VIEWING DEVICE

[76] Inventor: Lai-Jen Huang, Fl. 4, No. 213, Ming-Te Rd., Peitou Dist., Taipei City, Taiwan

[21] Appl. No.: 647,125

[22] Filed: Jan. 29, 1991

[51] Int. Cl.$^5$ .............................................. B42F 5/00
[52] U.S. Cl. ..................................... 402/4; 281/51; 281/29; 402/80 R
[58] Field of Search .................... 281/15.1, 51, 35, 29; 402/4, 80 R

[56] References Cited

U.S. PATENT DOCUMENTS 2,194,003  3/1940  Brooks ............................. 281/51 X
4,822,195  4/1989  Lu ................................. 402/80 R X

FOREIGN PATENT DOCUMENTS 3042034  6/1982  Fed. Rep. of Germany .... 402/80 R
0281997  11/1989  Japan ............................... 281/51

Primary Examiner—Paul A. Bell
Attorney, Agent, or Firm—Sughrue, Mion, Zinn, Macpeak and Seas

[57] ABSTRACT

A combined negative holder and viewing device includes a loose sheet binder having a three-sided rigid folder, and a loose sheet retainer mounted on the folder. An electrical negative viewing device is similarly mounted on the folder to provide lighting, thus facilitating the viewing of negatives.

8 Claims, 6 Drawing Sheets

COMBINED NEGATIVE HOLDER AND VIEWING DEVICE

BACKGROUND OF THE INVENTION

1. Field Of The Invention

The invention relates to a loose sheet binder for storing negative strips, more particularly to a combined negative holder and viewing device to facilitate viewing of the negatives.

2. Description Of The Related Art

After having a roll of film developed, the processed negative strips are usually returned in a sheet (a) of interconnected translucent pouches (b), as shown in FIG. 1. Referring to FIG. 2, the negative strips are then usually removed from the translucent pouches (b) they were returned in, and are transferred to the translucent pouches (e) of a plurality of loose negative holding sheets (d) bound together in a loose sheet binder (c). This step is both burdensome and time consuming. Furthermore, searching for a particular negative is made difficult since the translucent pouches (e) are not appropriately labeled. Thus, each negative strip must be drawn from the respective pouch (e) and raised near a light source when searching for a desired negative.

SUMMARY OF THE INVENTION

Therefore, the main objective of the present invention is to provide a combined negative holder and viewing device which facilitates the search for and viewing of negatives.

Accordingly, the preferred embodiment of a combined negative holder and viewing device of the present invention comprises a loose sheet binder including a three-sided rigid folder having a front panel, a rear panel, and a center panel hinged to and provided between the front and rear panels, and a loose sheet retainer mounted on the center panel. An electrical negative viewing device is mounted on the rear panel to provide sufficient lighting to view negatives. The electrical negative viewing device comprises: a hollow casing mounted on the rear panel and having a transparent top end; a reflector plate provided inside the hollow casing and dividing the hollow casing into upper and lower chambers; a cell means disposed inside the lower chamber; an electrical light source disposed inside the upper chamber; and a power supply switch to selectively connect the electrical light source to the cell means. A plurality of loose negative holding sheets are detachably bound by the loose sheet retainer. Each negative holding sheet has at least one receiving pouch to receive at least one strip of negatives.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 3:
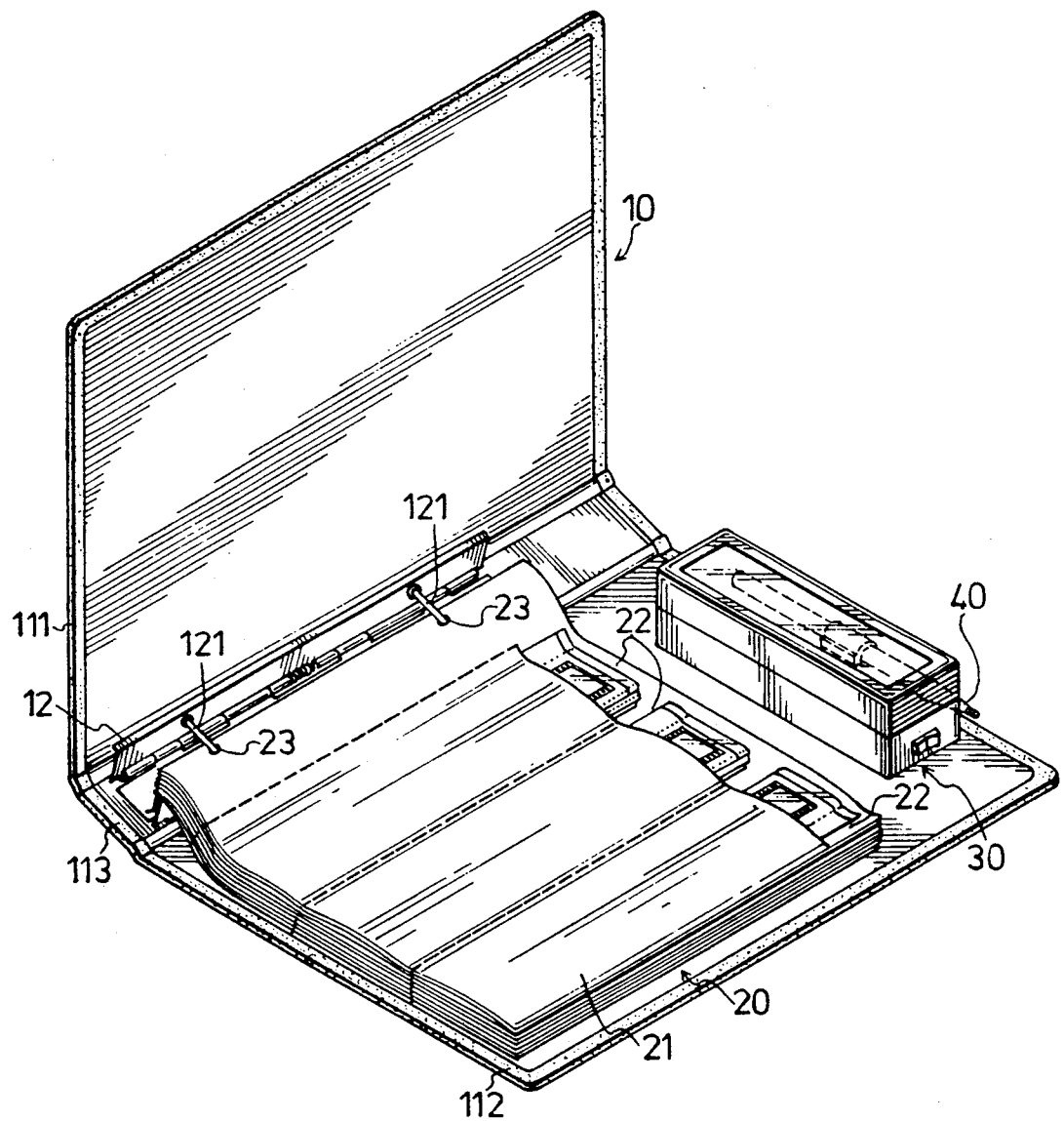
FIG. 3 is a perspective view of the preferred embodiment of a combined negative holder and viewing device according to the present invention.

Referring to FIG. 3, the preferred embodiment of a combined negative holder and viewing device according to the present invention is shown to comprise a loose sheet binder 10, a negative holding device 20, an electrical negative viewing device 30, and a writing implement 40.

The loose sheet binder 10 includes a three-sided rigid folder having a front panel 111, a rear panel 112, and a central panel 113 hinged to and provided between the front and rear panels 111 and 112. A loose sheet retainer means 12 is mounted on the inner surface of the central panel 113. The loose sheet retainer means 12 comprises a pair of ring-shaped retainers 121.

The negative holding device 20 comprises a plurality of loose negative holding sheets 21. Each negative holding sheet 21 has three receiving pouches 22. Each receiving pouch 22 can receive a plurality of strips of negatives disposed in a sheet (a) shown in FIG. 1. Each negative holding sheet 21 has a pair of punched holes 23 to detachably engage the ring-shaped retainers 121.

Figure 4:
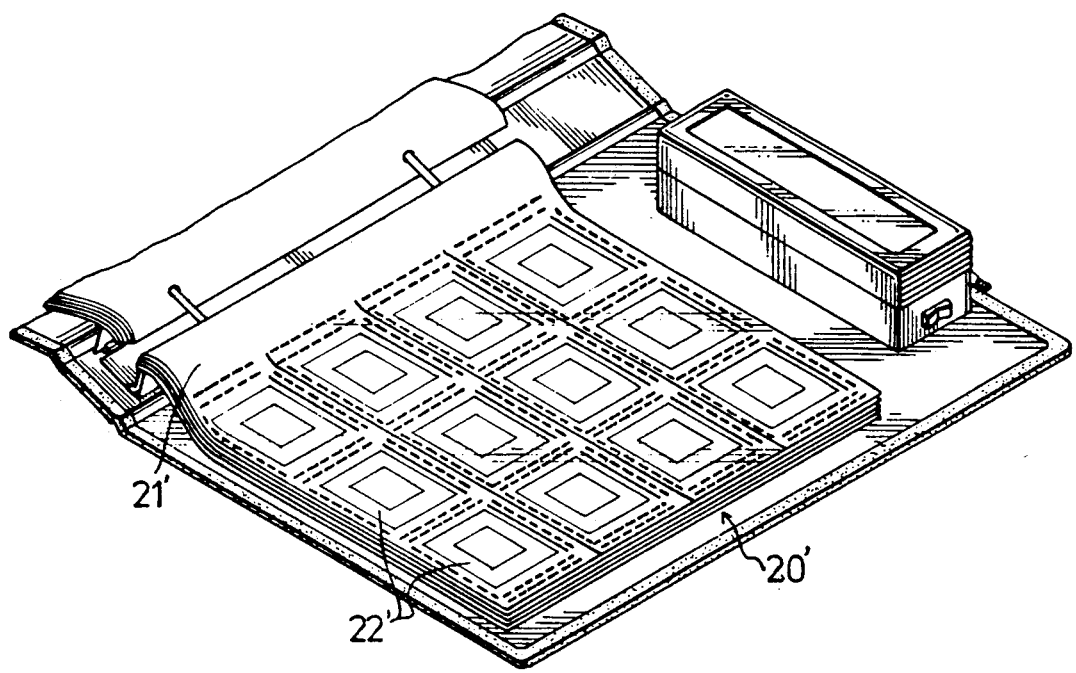
FIG. 4 is an illustration of the preferred embodiment when modified to store slides.

Referring to FIG. 4, the negative holding device 20' can be modified to comprise a plurality of slide holding sheets 21'. Each slide holding sheet 21' has a plurality of slide receiving pouches 22' to receive slides.

Figure 5:
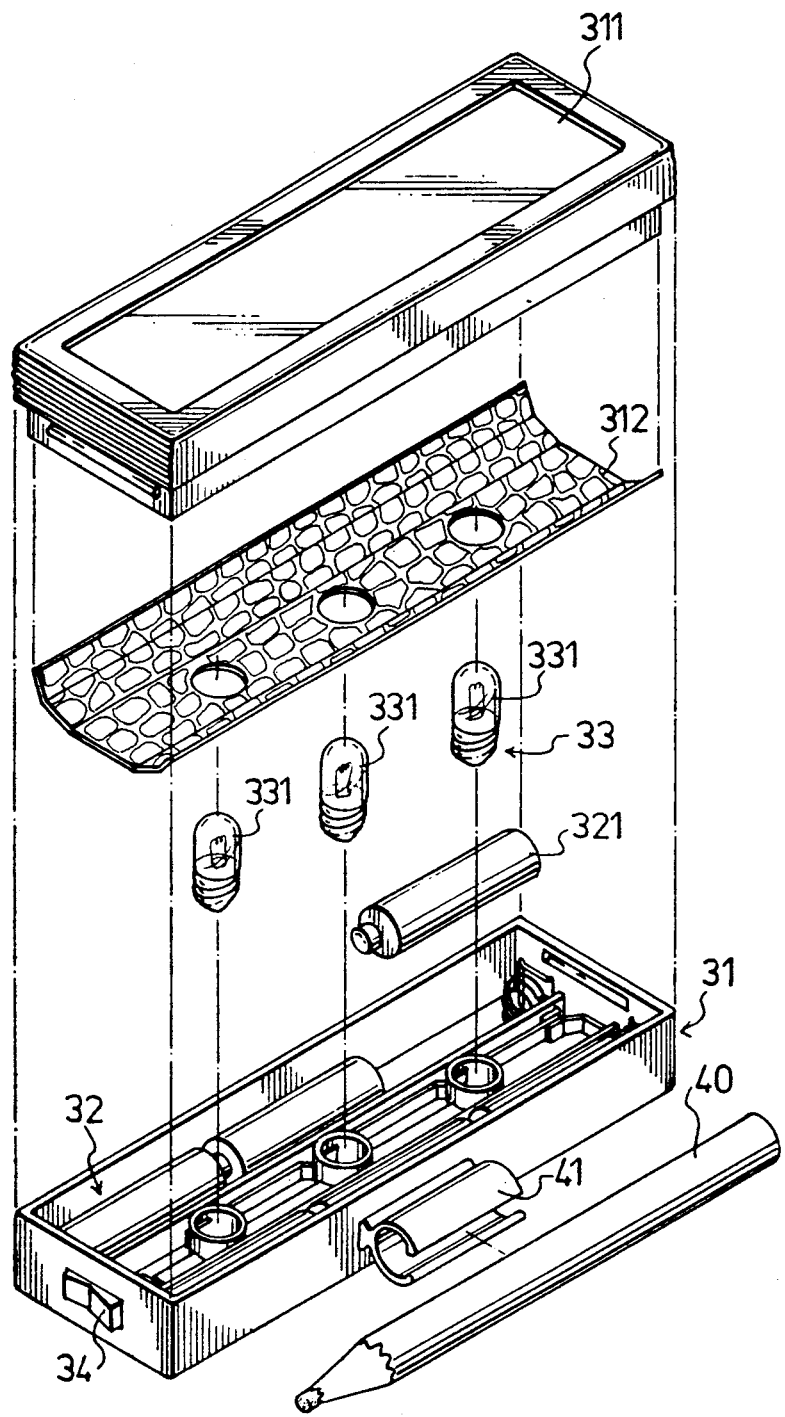
FIG. 5 is an exploded view of an electrical viewing device of the preferred embodiment.

Referring to FIGS. 3 and 4, the electrical negative viewing device 30 is mounted on the rear panel 112 and provides sufficient lighting to easily view negatives. Referring to FIG. 5, the electrical negative viewing device 30 comprises a hollow casing 31, cell means 32, an electrical light source 33, and a power supply switch 34.

The hollow casing 31 is mounted on the rear panel 112. A transparent cover 311 is provided on the top end of the hollow casing 31. A substantially concave reflector plate 312 is provided inside the hollow casing 31 and divides the hollow casing 31 into upper and lower chambers. The cell means 32 includes six battery cells arranged in electrical series connection and provided inside the lower chamber of the hollow casing 31. The electrical light source 33 includes three light bulbs 331 arranged in electrical series connection and provided inside the upper chamber of the hollow casing 31. A fluorescent lamp (not shown) may be used instead of the light bulbs 331. Light from the electrical light source 33 is reflected by the reflector plate 312 and is directed to the transparent cover 311. A power supply switch 34 is mounted on one side of the hollow casing 31 to selectively connect the electrical light source 33 to the cell means 32. The writing implement 40 is detachably mounted on the hollow casing 31 by a fastening ring 41 attached to the hollow casing 31.

Figure 1:
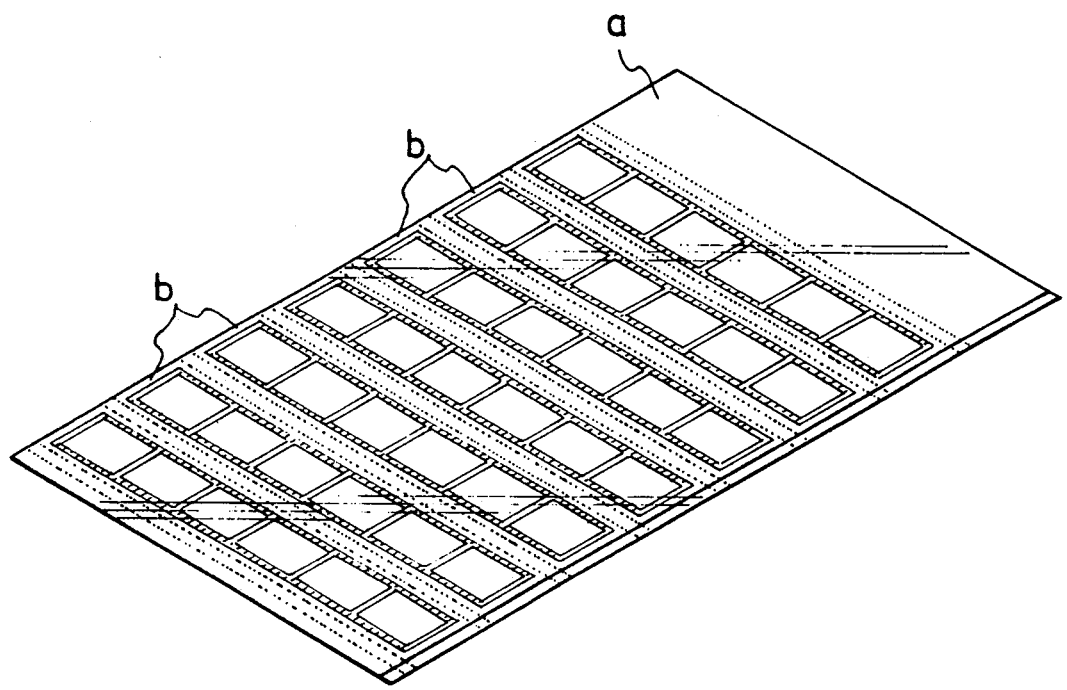
FIG. 1 is an illustration of a sheet of interconnected translucent pouches used to receive a plurality of negative strips.
Figure 2:
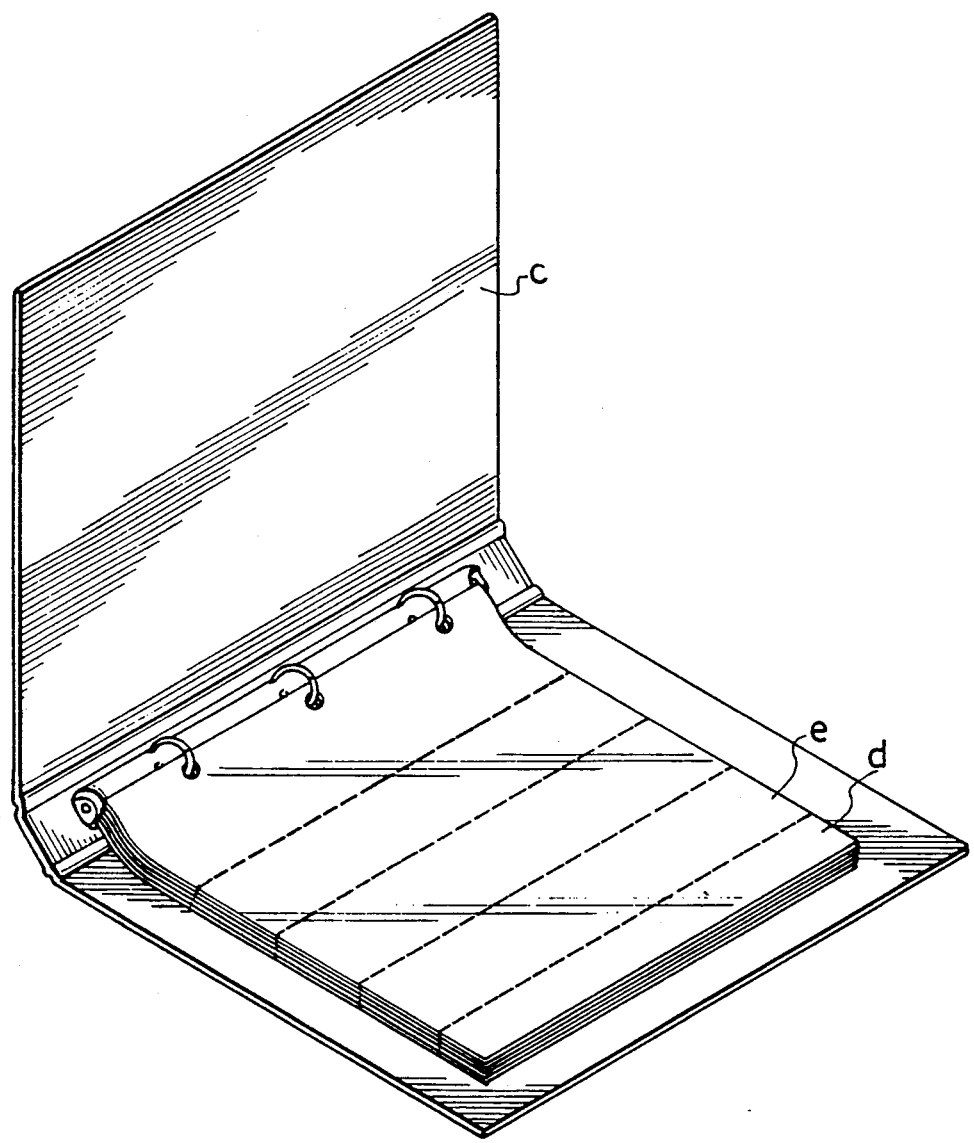
FIG. 2 is an illustration of a conventional negative holding device used to compile negative strips.

Referring once more to FIG. 3, after having a roll of film developed, the processed negative strips are disposed in translucent sheet, as shown in FIG. 1. The translucent sheet is then placed in one of the receiving pouches 22 of the negative holding sheets 21. The rigidity of the loose sheet binder 10 permits the preferred embodiment to be placed on a bookshelf for future use. Each of the receiving pouches 22 can be labeled to provide appropriate information, such as when and where were the corresponding pictures taken and who or what the subjects are. The negative holding sheets 21 can thus be indexed accordingly to facilitate the search for a desired negative when recopying pictures.

Figure 6:
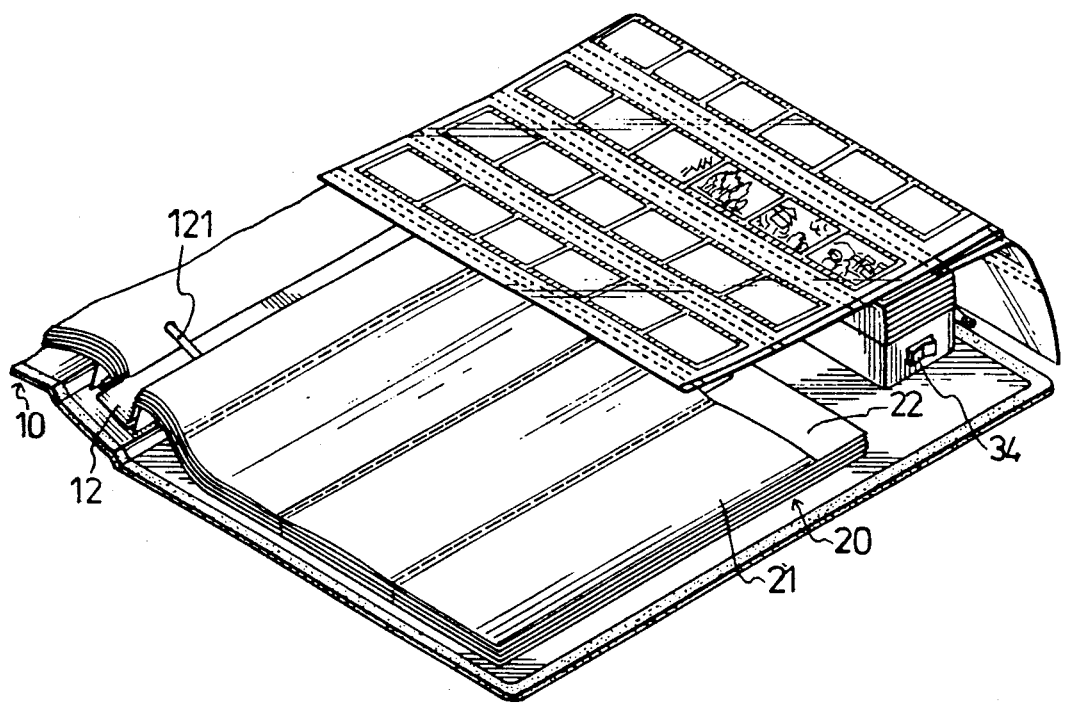
FIG. 6 is an illustration of the preferred embodiment when in use.

Referring to FIG. 6, when searching for a paricular negative in a sheet of negative strips, the power supply switch 34 of the electrical negative viewing device 30 is switched on to electrically connect the light source 33 to the cell means 32. The negative strips are then placed, without removing them from the sheet, one at a time, on top of the transparent cover 311 of the hollow casing 31. The writing implement 40 is then used to mark the desired negatives.

The main advantages of the combined negative holding and viewing device according to the present invention are as follows:

1. There is no need to transfer the negative strips, one by one, as in the conventional negative holding device. The order and grouping of negative strips is not disturbed, unlike those in the conventional negative holding device.
2. Each of the receiving pouches of the negative holding sheets can be labeled to provide appropriate information, thus facilitating the indexing and search for desired negatives.
3. When the desired sheet of negative strips has been found, the electrical negative viewing device is switched on to provide a light source so as to easily view the negatives. Searching for a particular negative can thus be accomplished faster.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A combined negative holder and viewing device, comprising:
    a loose sheet binder including a three-sided rigid folder having a front panel, a rear panel, and a center panel hinged to and provided between said front and rear panels, and a loose sheet retainer mounted on said center panel; and
    an electrical negative viewing device mounted on said rear panel to provide sufficient electrical lighting to view negatives.

2. The combined negative holder and viewing device as claimed in claim 1, further comprising a plurality of loose negative holding sheets detachably bound by said loose sheet retainer, each said negative holding sheet having at least one receiving pouch to receive at least one strip of negatives.

3. The combined negative holder and viewing device as claimed in claim 2, wherein said loose sheet retainer comprises at least one ring-shaped retainer, each said negative holding sheet having an appropriate number of punched holes to detachably engage said ring-shaped retainer.

4. The combined negative holder and viewing device as claimed in claim 1, wherein said electrical negative viewing device comprises:
    a hollow casing mounted on said rear panel and having a transparent top end;
    a reflector plate provided inside said hollow casing and dividing said hollow casing into an upper and a lower chamber;
    a cell means disposed inside said lower chamber;
    an electrical light source disposed inside said upper chamber; and
    a power supply switch to selectively connect said electrical light source to said cell means.

5. The combined negative holder and viewing device as claimed in claim 4, wherein said electrical light source comprises at least one light bulb.

6. The combined negative holder and viewing device as claimed in claim 4, wherein said electrical light source is a fluorescent lamp.

7. The combined negative holder and viewing device as claimed in claim 4, further comprising a writing implement detachably mounted on said hollow casing.

8. The combined negative holder and viewing device as claimed in claim 4, wherein said reflector plate is substantially concave.

* * * * *